(12) United States Patent
Kojima et al.

(10) Patent No.: US 11,370,932 B2
(45) Date of Patent: Jun. 28, 2022

(54) CURABLE COMPOSITION, ACCOMMODATING UNIT, DEVICE FOR FORMING TWO OR THREE DIMENSIONAL IMAGE, METHOD OF FORMING TWO OR THREE DIMENSIONAL IMAGE, AND CURED MATTER

(71) Applicant: RICOH COMPANY, LTD., Tokyo (JP)

(72) Inventors: Satoshi Kojima, Kanagawa (JP); Takayuki Shimizu, Kanagawa (JP); Shin Hasegawa, Tokyo (JP); Hiroki Kobayashi, Kanagawa (JP); Yuuki Matsushita, Kanagawa (JP); Yukiko Ishijima, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 16/748,850

(22) Filed: Jan. 22, 2020

(65) Prior Publication Data

US 2020/0231833 A1    Jul. 23, 2020

(30) Foreign Application Priority Data

Jan. 22, 2019   (JP) .............................. JP2019-008191

(51) Int. Cl.
*C09D 11/38*     (2014.01)
*B41M 5/00*      (2006.01)
(Continued)

(52) U.S. Cl.
CPC ............. *C09D 11/38* (2013.01); *B41J 2/2107* (2013.01); *B41J 11/002* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

2006/0160917 A1    7/2006  Oyanagi et al.
2013/0258015 A1*  10/2013  Mizutaki ................ B41J 2/2107
                                                      347/102
(Continued)

FOREIGN PATENT DOCUMENTS

CN    102382511 A    3/2012
CN    104395366 A    3/2015
(Continued)

OTHER PUBLICATIONS

U.S. Appl. No. 16/515,321, filed Jul. 18, 2019, Hiroshi Gotou, et al.
(Continued)

*Primary Examiner* — Manish S Shah
(74) *Attorney, Agent, or Firm* — Grüneberg and Myers PLLC

(57) ABSTRACT

A curable composition contains a polymerizable compound, a polymerization initiator, and a fluorescent whitener comprising a benzoxazole derivative, wherein the proportion of the fluorescent whitener is from 0.10 to 0.3 percent by mass and the proportion of the polymerization initiator is from 5 to 15 percent by mass.

19 Claims, 2 Drawing Sheets

(51) Int. Cl.
*C09D 11/101* (2014.01)
*B41J 11/00* (2006.01)
*B41J 2/21* (2006.01)
*C08K 5/353* (2006.01)
*B41J 2/01* (2006.01)

(52) U.S. Cl.
CPC ...... *B41J 11/00214* (2021.01); *B41M 5/0023* (2013.01); *C09D 11/101* (2013.01); *B41J 2/01* (2013.01); *C08K 5/353* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | | |
|---|---|---|---|---|
| 2013/0258017 | A1* | 10/2013 | Kagose | B41J 11/0015 347/102 |
| 2014/0066538 | A1* | 3/2014 | Sakamoto | C09D 11/322 522/16 |
| 2014/0220315 | A1* | 8/2014 | Zhang | C09D 11/101 428/200 |
| 2014/0375715 | A1* | 12/2014 | Kitada | B41J 2/04581 347/10 |
| 2015/0210876 | A1 | 7/2015 | Amao | |
| 2015/0274368 | A1* | 10/2015 | Nakano | B41J 2/17513 347/20 |
| 2016/0031232 | A1* | 2/2016 | Kagose | C09D 11/30 347/102 |
| 2017/0253680 | A1 | 9/2017 | Yamada | |
| 2017/0260405 | A1 | 9/2017 | Kumai et al. | |
| 2017/0267879 | A1 | 9/2017 | Kohzuki et al. | |
| 2017/0327705 | A1 | 11/2017 | Yamada | |
| 2017/0349772 | A1 | 12/2017 | Hirade et al. | |
| 2018/0333909 | A1 | 11/2018 | Arita et al. | |
| 2019/0023924 | A1 | 1/2019 | Yamada | |
| 2019/0031897 | A1 | 1/2019 | Hirade et al. | |
| 2019/0256727 | A1 | 8/2019 | Kumai et al. | |
| 2019/0270903 | A1 | 9/2019 | Kohzuki et al. | |
| 2019/0284416 | A1 | 9/2019 | Asami et al. | |
| 2020/0010662 | A1 | 1/2020 | Hiraoka et al. | |

FOREIGN PATENT DOCUMENTS

| | | |
|---|---|---|
| CN | 106574027 A | 4/2017 |
| EP | 2 923 843 A1 | 9/2015 |
| EP | 3 357 980 A1 | 8/2018 |
| JP | 2006-274025 | 10/2006 |
| JP | 2009-191118 A | 8/2009 |
| JP | 2012-207199 A | 10/2012 |
| JP | 2018-002960 | 1/2018 |
| JP | 2018-178020 A | 11/2018 |

OTHER PUBLICATIONS

Extended European Search Report dated May 26, 2020 in corresponding European Patent Application No. 20152753.8, 7 pages.
Chinese Office Action dated Aug. 25, 2021 in Chinese Patent Application No. 202010057061.7.

\* cited by examiner

CURABLE COMPOSITION, ACCOMMODATING UNIT, DEVICE FOR FORMING TWO OR THREE DIMENSIONAL IMAGE, METHOD OF FORMING TWO OR THREE DIMENSIONAL IMAGE, AND CURED MATTER

CROSS-REFERENCE TO RELATED APPLICATIONS

This patent application is based on and claims priority pursuant to 35 U.S.C. § 119 to Japanese Patent Application No. 2019-008191, filed on Jan. 22, 2019 in the Japan Patent Office, the entire disclosure of which is hereby incorporated by reference herein.

BACKGROUND

Technical Field

The present invention relates to a curable composition, an accommodating unit, a device for forming a two or three dimensional image, a method of forming a two or three dimensional image, and cured matter.

Description of the Related Art

Active energy ray curable inks are used or supplied for offset, silk screen, top coating agents, etc. and become popular due to its cost reduction by simplifying drying processes and advantages such as less volatile amounts of solvents, which is good for protection of the environment. For example, decorative printing on a substrate with an active energy ray curable ink is expanding for industrial use.

SUMMARY

According to embodiments of the present disclosure, provided is a curable composition which contains a polymerizable compound, a polymerization initiator, and a fluorescent whitener containing a benzoxazole derivative, wherein the proportion of the fluorescent whitener is from 0.10 to 0.3 percent by mass and the proportion of the polymerization initiator is from 5 to 15 percent by mass.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
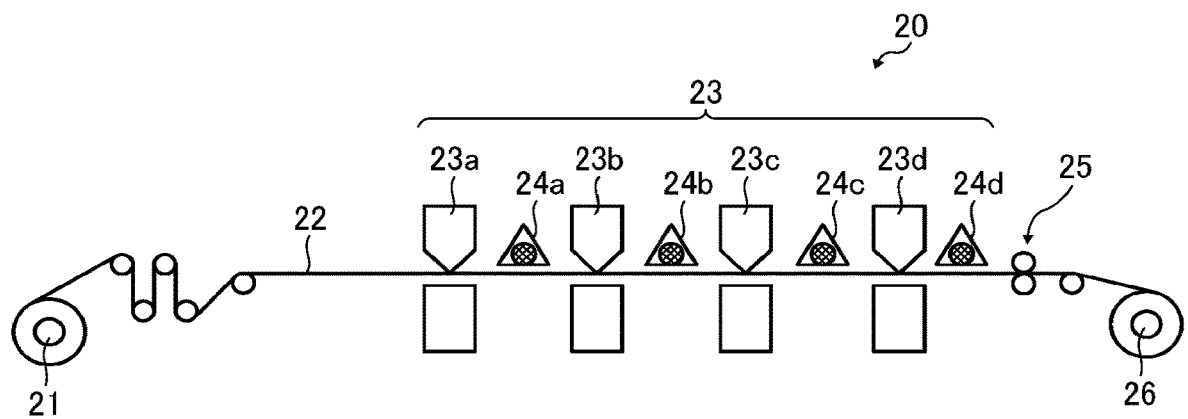
FIG. 1 is a schematic diagram illustrating an example of an image forming device equipped with an inkjet discharging device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a curable composition can be provided which strikes a balance between excellent hue and excellent storage stability while securing a high level of curability and good discharging stability.

For designing an active energy ray-curable ink required to be clear and transparent in the case of a transparent ink or have a high level of whiteness in the case of a white ink, active energy ray curable inks have been tried to improve the tendency of the active energy ray curable ink changing color into yellow upon application of active energy rays.

For example, an ink composition containing at least a polymerizable compound, a photopolymerization initiator, a polymerization accelerator, and a fluorescent whitener has been proposed in which the absorption wavelength band of the photopolymerization initiator and the emission wavelength band of the fluorescent whitener partially overlap (for example, in JP-2006-274025-A1).

Curable Composition

The curable composition of the present disclosure includes a polymerizable compound, a polymerization initiator, and a fluorescent whitener containing a benzoxazole derivative, wherein the proportion of the fluorescent whitener is from 0.10 to 0.3 percent by mass and the proportion of the polymerization initiator is from 5 to 15 percent by mass. The curable composition may furthermore optionally contain other components.

Fluorescent whiteners absorb light in the ultraviolet region of a wavelength of from 200 to 400 nm and emits fluorescence in the visible region of a wavelength of from 400 to 600 nm. Therefore, if such a fluorescent whitener is used in combination with a photopolymerization initiator, light absorption of the photopolymerization initiator and the fluorescent whitener compete with each other, which inevitably degrades curability of an active energy ray curable ink.

In addition, since polymerization accelerators are fine particle having a polymerizable functional group and an amino group on the surface, there is a concern about degradation of discharging stability and a decrease in gloss and a decrease in color gamut due to unevenness of the surface.

On the other hand, in the curable composition of the present disclosure, the fluorescent whitener contains a benzoxazole derivative, the proportion of the fluorescent whitener is from 0.10 to 0.3 percent by mass, and the proportion of the polymerization initiator is from 5 to 15 percent by mass. This strikes a balance between excellent hue and excellent storage stability while securing a high level of curability and good discharging stability.

As the curable composition of the present disclosure, a curable clear ink composition, a thermocurable composition, an active energy ray curable composition, etc., can be used. Of these, the active energy ray curable composition is more suitable.

Polymerizable Compound

Examples of the polymerizable compound include, but are not limited to, a monofunctional monomer, a polyfunctional monomer, and a polymerizable oligomer.

Monofunctional Monomer

The monofunctional monomer is not particularly limited and can be suitably selected to suit to a particular application.

Specific examples include, but are not limited to, phenoxyethyl (meth)acrylate, tetrahydrofurfuryl (meth)acrylate, isobornyl (meth)acrylate, 2-hydroxyethyl (meth)acrylate, 4-hydroxybutyl (meth)acrylate, isobutyl (meth)acrylate, t-butyl (meth)acrylate, isooctyl (meth)acrylate, 2-methoxyethyl (meth)acrylate, methoxytriethylene glycol (meth)acrylate, 2-ethoxyethyl (meth)acrylate, 3-methoxybutyl (meth)acrylate, ethoxyethyl (meth)acrylate, butoxyethyl (meth)acrylate, ethoxydiethyleneglycol (meth)acrylate, 2-hydroxyethyl (meth)acrylate, ethyl diglycol (meth)acrylate, cyclic trimethylolpropane formal mono(meth)acrylate, imide (meth)acrylate, isoamyl (meth)acrylate, ethoxylated succinic acid (meth)acrylate, trifluoroethyl (meth)acrylate, ω-carboxypolycaprolactone mono(meth)acrylate, benzyl (meth)acrylate, methylphenoxyethyl (meth)acrylate, cyclohexyl (meth)acrylate, 4-t-butylcyclohexyl (meth)acrylate, caprolactone-modified tetrahydrofurfuryl (meth)acrylate, tribromophenyl (meth)acrylate, ethoxylated tribromophenyl (meth)acrylate, 2-phenoxyethyl (meth)acrylate, (meth)acryloylmorpholine, phenoxydiethylene glycol (meth)acrylate, 2-hydroxy-3-phenoxypropyl (meth)acrylate, 1,4-cyclohexanedimethano mono(meth)acrylate, 2-(2-ethoxyethoxy) ethyl (meth)acrylate, stearyl (meth)acrylate, diethylene glycol monobutyl ether (meth)acrylate, lauryl (meth)acrylate, isodecyl (meth)acrylate, 3,3,5-trimethylcyclohexanol (meth)acrylate, isooctyl (meth)acrylate, octyl/decyl (meth)acrylate, tridecyl (meth)acrylate, caprolactone (meth)acrylate, ethoxylated (4) nonylphenol (meth)acrylate, methoxypolyethylene glycol (350) mono(meth)acrylate, methoxypolyethylene glycol (550) mono(meth)acrylate, N-vinyl formamide, N-vinylcaprolactam, and vinylpyrrolidone. These can be used alone or in combination. Of these, isobornyl (meth)acrylate, (meth)acryloyl morpholine, cyclic trimethylolpropane formal (meth)acrylate, and hydroxyethyl (meth)acrylate are preferable.

The proportion of the monofunctional monomer to the total mass of the curable composition is preferably from 50 to 90 percent by mass and more preferably from 70 to 90 percent by mass.

Polyfunctional Monomer

The polyfunctional monomer has two or more ethylenically unsaturated double bonds.

Specific examples include, but are not limited to, tricyclododecane dimethylol di(meth)acrylate, hexamethylene di(meth)acrylate, trimethylol propane tri(meth)acrylate, pentaerythritol tri(meth)acrylate, pentaerythritol tetra(meth)acrylate, ethylene glycol di(meth)acrylate, polyethylene glycol di(meth)acrylate, tetraethylene glycol di(meth)acrylate, dipropylene glycol di(meth)acrylate, tripropylene glycol tri(meth)acrylate, polypropylene glycol di(meth)acrylate, neopentyl glycol di(meth)acrylate, bispentaerythritol hexa(meth)acrylate, diethylene glycol di(meth)acrylate, 1,6-hexanediol di(meth)acrylate, ethoxylated 1,6-hexanediol di(meth)acryl, 1,4-butanediol di(meth)acrylate, 1,9-nonanediol di(meth)acrylate, 2-n-butyl-2-ethyl-1,3-propanediol di(meth)acrylate, neopentyl glycol di(meth)acrylate hydroxypivalate, trimethylolpropane tri(meth)acrylate hydroxypivalate, 1,3-butylene glycol di(meth)acrylate, ethoxylated tri(meth)acrylate phosphate, ethoxylated tripropylene glycol di(meth)acrylate, neopentyl glycol-modified trimethylolpropane di(meth)acrylate, stearic acid-modified pentaerythritol di(meth)acrylate, tetramethylolmethane tri(meth)acrylate, tetramethylolmethane tetra(meth)acrylate, tetramethylol propane tri(meth)acrylate, caprolactone-modified trimethylolpropane tri(meth)acrylate, propoxylate glyceryl tri(meth)acrylate, ditrimethylol propane tetra(meth)acrylate, ethoxylated pentaerythritol tetra(meth)acrylate, dipentaerythritol hexa(meth)acrylate, caprolactone-modified dipentaerythritol hexa(meth)acrylate, dipentaerythritol hydroxypenta (meth)acrylate, neopentyl glycol oligo(meth)acrylate, 1,4-butanediol oligo(meth)acrylate, 1,6-hexanediol oligo(meth)acrylate, trimethylolpropane oligo(meth)acrylate, pentaerythritol oligo(meth)acrylate, ethoxylated neopentyl glycol di(meth)acrylate, propoxylated neopentyl glycol di(meth)acrylate, tripropylene glycol di(meth)acrylate, ethoxylated trimethylolpropane tri(meth)acrylate, and propoxylated trimethylolpropane tri(meth)acrylate. These can be used alone or in combination.

The proportion of the polyfunctional monomer including the polyfunctional polymerizable oligomer, which is described later, is preferably from 0.01 to 20 percent by mass and more preferably from 5 to 15 percent by mass to the total content of the curable composition.

Polymerizable Oligomer

The polymerizable oligomer has an ethylenically unsaturated double bond. Examples include, but are not limited to, an aromatic urethane oligomer, an aliphatic urethane oligomer, an epoxy acrylate oligomer, a polyester acrylate oligomer, and other special oligomers.

The polymerizable oligomer is available on the market. Specific examples include, but are not limited to, UV-2000B, UV-2750B, UV-3000B, UV-3010B, UV-3200B, and UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (all manufactured by The Nippon Synthetic Chemical Industry Co., Ltd.), CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (all manufactured by Sartomer Company), EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (all manufactured by Daicel Cytec). These can be used alone or in combination.

The proportion of the polymerizable oligomer to the total mass of the curable composition is preferably from 0.01 to 15 percent by mass and more preferably from 1 to 10 percent by mass. When the proportion is from 0.01 to 15 percent by mass, a cured product with good attachability and sufficient hardness can be obtained.

Polymerization Initiator

The composition of the present disclosure may contain a polymerization initiator. In addition, the polymerization initiator is also simply referred to as an initiator. Examples of the polymerization initiator include, but are not limited to, thermal polymerization initiators and photopolymerization initiators.

The photopolymerization initiator produces active species such as a radical or a cation upon an application of energy of active energy rays and initiates polymerization of a polymerizable compound (monomer or oligomer). It is suitable to use a known radical polymerization initiator, a cation polymerization initiator, a base producing agent, or a combination thereof as the photopolymerization initiator. Of these, radical polymerization initiators are preferable.

Specific examples of the radical polymerization initiators include, but are not limited to, aromatic ketones, acylphosphineoxide compounds, aromatic oniumchlorides, organic peroxides, thio compounds (thioxanthone compounds, compounds including thiophenyl groups, etc.), hexaarylbiimidazole compounds, ketoxime-esterified compounds, borate compounds, azanium compounds, metallocene compounds, active ester compounds, compounds having a carbon halogen bond, and alkylamine compounds.

In addition, a polymerization accelerator (sensitizer) can be optionally used together with the polymerization initiator. The polymerization accelerator is not particularly limited. Specific examples include, but are not limited to, amine compounds such as trimethyl amine, methyldimethanol amine, triethanol amine, p-diethylamino acetophenone, p-dimethylamino ethylbenzoate, p-dimethyl amino benzoate-2-ethylhexyl, N,N-dimethyl benzylamine, and 4,4'-bis(diethylamino)benzophenone.

The proportion of the polymerization accelerator is suitably determined to suit to a particular application depending on the identification and the amount of the polymerization initiator.

The proportion of the polymerization initiator to the total mass of the curable composition is preferably from 5 to 15 percent by mass and more preferably from 7 to 12 percent by mass. When the proportion of the polymerization initiator is 5 percent by mass or more, the curability is good. When the proportion of the polymerization initiator is 15 percent by mass or less, yellowing does not occur after curing.

The absolute difference ($\Delta$HSP) between the Hansen solubility parameter (HSP) value of the polymerizable compound and the HSP value of the polymerization initiator is 4 $[(\text{J/cm}^3)^{0.5}]$ or less. When $\Delta$HSP is 4 $[(\text{J/cm}^3)^{0.5}]$ or less, the polymerization initiator can be easily dissolved, which ameliorates the discharging stability.

The Hansen solubility parameter (HSP) is what is represented in a three dimensional space using three components of dispersion term ($\delta$D), polarity term ($\delta$), and hydrogen bond term ($\delta$H), which are obtained by dividing the solubility parameter (SP) introduced by Hidebrand. The dispersion term ($\delta$D) is based on proximity force of Van Der Waals. The polarity ($\delta$P) is also referred to as polarization term and based on dipole moment and dielectric constant. The hydrogen bond term ($\delta$H) includes an intermolecular force based on hydrogen bond and furthermore other unclassifiable factors such as $\pi$-$\pi$ interaction.

The three components of the dispersion term ($\delta$D), the polarity term ($\delta$), and the hydrogen bond term ($\delta$H) have been obtained by Hansen and his successors. The details are described in Polymer Handbook (fourth edition), VII-698 to 711. The definition and calculation of HSP are described in the following document. Hansen Solubility Parameters: A Users Hand book (authored by Charles M. Hansen, published by CRC Press in 2007).

Hansen solubility parameters of many solvents and resins have been obtained, which are described in, for example, Industrial Solvents Handbook, authored by Wesley L. Archer.

The total HSP value is the sum of the three vectors described above. The HSP value can be calculated by software such as HSPiP. Those having similar vectors based on the HSP value can be determined to be highly compatible to each other.

The above-mentioned HSP value can be expressed as follows.

$$(\delta_D^2 + \delta_P^2 + \delta_H^2)^{0.5}$$

The factors in the relationship are as follows.
$\delta_D$: Non-polar HSP value (dispersion HSP value)
$\delta_P$: Polarity HSP value
$\delta_H$: Hydrogen bond HSP value Fluorescent Whitener As the fluorescent whitener, benzoxazole derivatives are used.

A specific example is 1,4-bis(2-benzoxazolyl) naphthalene.

1,4-bis(2-benzoxazolyl) naphthalene is represented by the following Chemical formula, which can impart a bluish tint to a white or clear coating film and improves curability as a sensitizer.

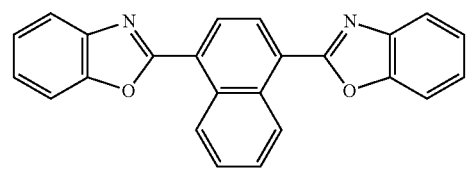 [SMILES: c1ccc2oc(-c3ccc(-c4nc5ccccc5o4)c4ccccc34)nc2c1]

The benzoxazole derivative is available on the market. Specific examples include, but are not limited to, Kayalight OS, Hostalux KCB, and Telalux KCB.

As the fluorescent whitener, in addition to the benzoxazole derivative mentioned above, pyrene derivatives, coumarin derivatives, oxazole derivatives, thiazole derivatives, imidazole derivatives, benzimidazole derivatives, imidazolone derivatives, pyrarizone derivatives, benzidine derivatives, and stilbene derivatives can be used.

The fluorescent whitener is available on the market. Specific examples include, but are not limited to, Hostalux KVC, KS, KS-N, KS-C, KSB, KSB-2, KCU, KM-N, NSM, SNR, NR, N2R-200, and Leukopur EGM (all manufactured by Clariant AG), UVITEX OB, OB-C, and OB-P (all manufactured by Ciba Japan K. K.), Kayalight B and OSN (both manufactured by Nippon Kayaku Co., Ltd.), Hakkol P and OB (both manufactured by Showa Chemical Industry Co., LTD.), Whitefluor B, PSN, HCS, PHR, and PCS (all manufactured by SUMIKA COLOR CO., LTD.), and NIKKAFLUOR RP, 2R, SB, KB, EFS, OB, SC 200, and MC (all manufactured by Nippon Chemical Works Co., Ltd.).

The proportion of the fluorescent whitener is from 0.10 to 0.3 percent by mass to the total content of the curable composition. When the proportion of the fluorescent whitener is 0.10 percent by mass or more, the addition effect of the fluorescent whitener becomes sufficient. When the proportion of the fluorescent whitener is 0.3 percent by mass or less, transparency and durability are good after curing.

Other Optional Components

The curable composition of the present disclosure may furthermore optionally include other components. The other components are not particularly limited and can be suitably selected to suit to a particular application. Examples include, but are not limited to, coloring materials, organic solvents, surfactants, polymerization inhibitors, leveling agents, defoaming agents, penetration-enhancing agents, wetting agents (humectants), fixing agents, viscosity stabilizers, fungicide, preservatives, antioxidants, ultraviolet absorbents, chelate agents, pH regulator, and thickeners.

Coloring Material

The curable composition may include a coloring material. However, it is preferable that the curable composition be substantially free of the coloring material. The curable composition of the present disclosure does not necessarily include a coloring material and can be clear and colorless. If the curable composition is free of a coloring material, the curable composition is suitable as an overcoat layer to protect images.

As the coloring material, depending on the objectives and requisites of the composition in the present disclosure, various types of pigments and dyes can be used to impart black, white, magenta, cyan, yellow, green, orange, and gloss color such as gold and silver.

The proportion of the coloring material is not particularly limited and determined considering the desired color density, dispersibility of the coloring material in the curable composition, etc. Preferably, the proportion of the coloring material to the total content of the curable composition is from 0.1 to 20 percent by mass.

The pigment can be inorganic or organic and a combination thereof.

Specific examples of the inorganic pigments include, but are not limited to, carbon blacks (C. I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, chelate azo pigments, etc.), polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments.

In addition, a dispersant is optionally added to enhance the dispersibility of a pigment.

The dispersant has no particular limit. For example, it is suitable to use a polymer dispersant conventionally used to prepare a pigment dispersion.

The dyes include, for example, acidic dyes, direct dyes, reactive dyes, basic dyes, and combinations thereof.

Organic Solvent

The curable composition of the present disclosure may include an organic solvent. However, it is preferable that the composition be free of the organic solvent. The composition free of an organic solvent, in particular a volatile organic solvent (compound) (VOC), is preferable because it enhances safeness at which the composition is handled so that pollution of the environment can be prevented. Incidentally, the organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially included. The proportion thereof is preferably less than 0.1 percent by mass.

For each component in the curable composition, low molecular weight components such as a polymerizable monomer and a polymerization initiator can be identified by, for example, gas chromatography mass spectrometry. The polymer component is dissolved in a poor solvent such as methanol to precipitate for separation. The main skeleton and the proportion of the content of the chlorine atom can be identified by infrared spectroscopy or elemental analysis.

Preparation of Composition

The curable composition of the present disclosure can be prepared by using the components mentioned above. The preparation devices and conditions are not particularly limited. For example, the curable composition can be prepared by loading a polymerizable compound, a pigment, a dispersant, etc., into a dispersing machine such as a ball mill, a kitty mill, a disk mill, a pin mill, and a DYNO-MILL to prepare a pigment liquid dispersion followed by mixing with a polymerizable compound, a polymerization initiator, a fluorescent whitener, a polymerization inhibitor, and a surfactant.

Viscosity

The viscosity of the curable composition of the present disclosure has no particular limit and it can be adjusted to suit to a particular application and device. For example, if a discharging device that discharges the curable composition from nozzles is used, the viscosity thereof is 60 mPa·s or less, preferably in the range of from 3 to 40 mPa·s, more preferably from 5 to 30 mPa·s, furthermore preferably from 5 to 15 mPa·s, and particularly preferably from 6 to 12 mPa·s in the temperature range of from 20 to 65 degrees C., preferably at 25 degrees C.

In addition, it is particularly preferable to satisfy this viscosity range without including the organic solvent mentioned above. Viscosity can be measured by a cone-and-plate type rotary viscometer (VISCOMETER TVE-22L, manufactured by TOKI SANGYO CO., LTD.) using a cone rotor (1°34'×R24) at a rotational frequency of 50 rpm with a setting of the temperature of hemathermal circulating water in a range of from 20 to 65 degrees C. VISCOMATE VM-150III can be used for the temperature control of the circulating water.

Curing Device

The curing device to cure the curable composition of the present disclosure utilizes curing upon application of heat or active energy rays. Curing upon application of active energy rays is preferable.

The active energy rays for use in curing the curable composition are not particularly limited as long as they can apply energy to conduct polymerization reaction of the polymerizable components in the curable composition. Specific examples include, but are not limited to, electron beams, α rays, β rays, γ rays, and X rays, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source. It is more preferable to use a light-emitting diode emitting light having a wavelength of from 350 to 450 nm, in particular, 350 nm to 400 nm.

Field of Application

The application field of the curable composition of the present disclosure is not particularly limited. It can be applied to any field where the active energy ray curable composition is used and suitably selected to suit to a particular application. For example, the curable composition is used as a resin for processing, a paint, an adhesive, an insulant, a releasing agent, a coating material, a sealing material, various types of resists, and various types of optical materials.

Figure 2:
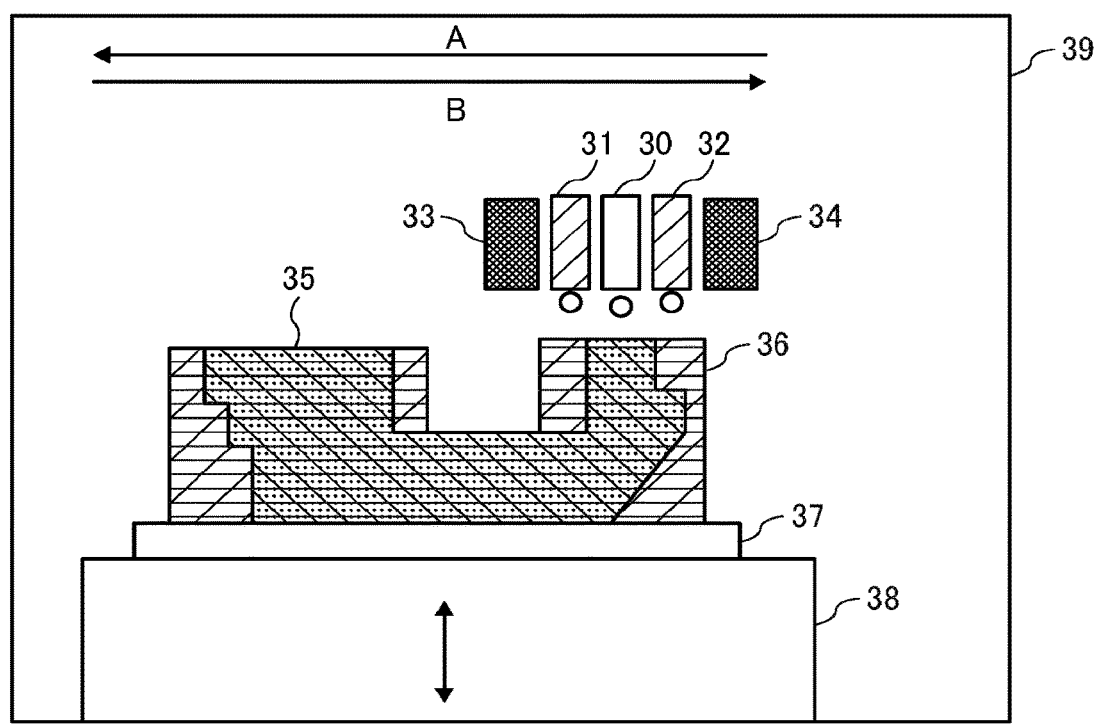
FIG. 2 is a schematic diagram illustrating an example of another image forming device (device for fabricating a three-dimensional image)
Figure 3A:
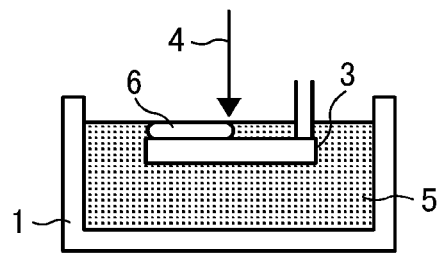
FIGS. 3A, 3B, 3C, and 3D are schematic explanatory diagrams illustrating an example of a method of solid free-form fabrication using a curable composition.
Figure 3B:
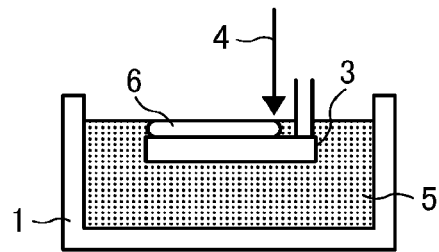
Figure 3C:
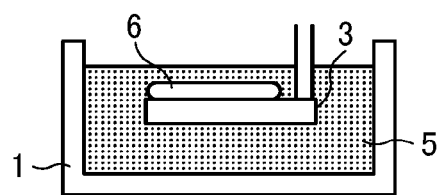
Figure 3D:
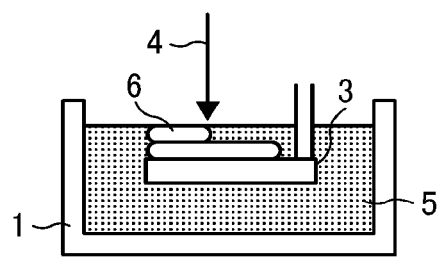

Furthermore, the curable composition of the present disclosure can be used as an ink to form two-dimensional texts, images, and designed coating film on various types of substrates and in addition, a solid object forming material to form a three-dimensional image (solid freeform fabrication object). This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in additive manufacturing (stereolithography) method as illustrated in FIG. 2 and FIGS. 3A to 3D. FIG. 2 is a diagram illustrating a method of discharging the active energy ray curable composition of the present disclosure to a particular area followed by curing upon irradiation of active energy rays to form a layer and laminating the layers (detail of which is described later).

FIGS. 3A to 3D are diagrams illustrating a method of irradiating a pool (accommodating unit) 1 of the active energy ray curable composition 5 of the present disclosure with active energy rays 4 to form a cured layer 6 having a particular form on a movable stage 3 and sequentially laminating the cured layer 6 so that a solid freeform fabrication object is obtained.

A device for fabricating a three-dimensional (solid) object by the curable liquid composition of the present disclosure can be a known device and is not particularly limited. For example, the device includes an accommodating device, a supplying device, and a discharging device (applying device) of the curable composition, an active energy ray irradiator (curing device), etc.

In addition, the present disclosure includes cured matter obtained by causing the curable liquid composition to cure and processed products obtained by processing structures having the cured matter formed on a substrate. The cured matter or structure having a sheet-like form or film-like form is subject to molding process such as hot drawing and punching to obtain such a processed product. The processed product is preferably used for, for example, gauges or operation panels of vehicles, office machines, electric and electronic machines, and cameras, which requires surface-processing after decorating the surface.

The substrate is not particularly limited. It can be suitably selected to suit to a particular application. Examples are paper, fiber, threads, fabrics, leather, metal, plastic, glass, wood, ceramics, or composite materials thereof. Of these, plastic substrates are preferred in terms of processability.

Accommodating Unit

The accommodating unit of the present disclosure means a container containing the curable composition of the present disclosure and is suitable for the applications as described above. For example, if the curable composition of the present disclosure is used for ink, the accommodating unit containing the ink can be used as an ink cartridge or an ink bottle. Therefore, users can avoid direct contact with the ink during working such as transfer or replacement of the ink, so that fingers and clothes are prevented from getting dirty. Furthermore, commingling of foreign matter such as dust in the ink can be prevented. In addition, the container can be of any size, any form, and any material. For example, the container can be designed for any particular purpose and usage. It is preferable to use a light blocking material to block the light or cover a container with a light blocking sheet, etc.

Image Forming Method and Image Forming Device

The image forming method (method of forming a two or three dimensional image) of the present disclosure may utilize active energy rays, heating, etc. The image forming method of the present disclosure includes at least irradiating the curable composition of the present disclosure with active energy rays to cure the curable composition. The image forming device (device for forming a two or three dimensional image) of the present disclosure includes an irradiator to irradiate the curable composition of the present disclosure with active energy rays and an accommodating unit containing the curable composition of the present disclosure. The accommodating unit may include the container mentioned above. Furthermore, the method and the device may respectively include discharging the curable composition of the present disclosure and a discharging device (application device) to discharge the curable composition of the present disclosure. The method of discharging the curable composition is not particularly limited. Examples are a continuous spraying method and an on-demand method. The on-demand method includes a piezo method, a thermal method, an electrostatic method, etc.

FIG. 1 is a diagram illustrating an image forming device 20 including an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roll 21. Thereafter, light sources 24a, 24b, 24c, and 24d emit active energy rays to the inks to cure the inks so that a color image is formed. Thereafter, a recording medium 22 is transferred (conveyed) to a processing unit 25 and a printed matter reeling roll 26. Each of the printing unit 23a, 23b, 23c, and 23d may include a heating assembly to liquidize the ink at the ink discharging unit. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head held at a fixed position while continuously moving the recording medium.

The recording medium 22 is not particularly limited. Specific examples include, but are not limited to, paper, film, metal, or complex materials thereof. The recording medium 22 takes a sheet-like form but is not limited thereto. The image forming device may have a simplex printing configuration capable of printing on one side of a recording medium or a duplex printing configuration capable of printing on both sides thereof.

Optionally, multiple colors can be printed with no or faint active energy rays from the light sources 24a, 24b, and 24c, followed by irradiation of the active energy rays by the light source 24d. This saves energy and cost.

The recorded matter on which images are printed with the ink for use in the present disclosure includes articles having images or texts on a plain surface of conventional paper, resin film, etc. a rough surface, or a surface made of various materials such as metal or ceramic. In addition, due to lamination of two dimensional images, it is possible to form an image partially with solid feeling (images with two dimension and three dimension) or a solid object.

FIG. 2 is a schematic diagram illustrating an example of the image forming device (device for fabricating a three-dimensional image) relating to the present disclosure. The image forming device 39 illustrated in FIG. 2 uses a head unit (movable in the AB direction) in which inkjet heads are arranged to discharge a first curable composition from a discharging head unit 30 for fabrication and discharge the first curable composition from discharging head units 31 and 32 for support and irradiate the applied first curable composition with active energy rays emitted from ultraviolet irradiators 33 and 34 to solidify to form a first fabrication layer. This operation is repeated according to the number of laminations while moving a stage 38 movable up and down, thereby laminating support layers and fabrication layers to manufacture a solid freeform fabrication object 35 including a laminated support 36. Thereafter, a laminated support 36 is removed, if desired. The reference numeral 37 represents a support substrate for a fabrication object. Although there is only one of the discharging head unit 30 for fabrication illustrated in FIG. 2, the device may have two or more discharging head units 30.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but not limited thereto.

Examples 1 to 5 and Comparative Examples 1 to 8

Each of the materials shown in Tables 1 to 3 was sequentially added during stirring and thereafter stirred for two hours to prepare curable compositions of Examples 1 to 5 and Comparative Examples 1 to 8.

Next, for each of the obtained curable compositions, curability, storage stability, discharging stability, and hue were evaluated in the following manner.

Curability

Using a UV irradiator (LH6, manufactured by Fusion Systems Japan Co., Ltd.), the test machine mentioned below discharged each curable composition onto the substrate mentioned below to form a solid cured product. The cured product was irradiated in the wavelength region corresponding to UV-A region (from 350 to 400 nm) changing the cumulative amount of light step by step from 1,000 mJ/cm$^2$, 500 mJ/cm$^2$, 200 mJ/cm$^2$, 100 mJ/cm$^2$, 50 mJ/cm$^2$, 20 mJ/cm$^2$, to 10 mJ/cm$^2$. Whether the curable composition was cured was determined as cured when the curable composition was not attached to a finger by a sensory evaluation by palpation. After determined as cured, the cured matter was subject to the following evaluation. This is the palpation of a bulk (solid) cured matter and was evaluated according to the following three levels.

Curing Condition

The cumulative amount of light required for curing in each Example was from 700 to 4,000 mJ/cm$^2$.

Preparation of cured product: Discharging tester equipped with GEN4 head (manufactured by Ricoh Printing Systems Co., Ltd.)

Cured product design: solid printing on the entire surface, thickness about 20 μm Substrate: polycarbonate film (PC) (manufactured by Mitsubishi Engineering-Plastics Corporation, Iupilon 100FE2000 masking, thickness 100 μm)

Evaluation Criteria

A: Not sticky by finger touch

B: Slightly sticky by finger touch but no trace of finger remained

C: Trace of finger remained

Storage Stability

Each curable composition was placed in a polyethylene container and sealed and stored at 70 degrees C. for three weeks. Thereafter, the mean volume diameter, the surface tension at 25 degrees C., and the viscosity at 25 degrees C. of each curable composition were measured before and after the storage. Based on the change ratio to the initial physical properties, storage stability was evaluated according to the following evaluation criteria. In addition, of the physical properties of mean volume diameter, surface tension, and viscosity, the physical property having the maximum change ratio was evaluated for each curable composition. The rating A and the above are practically usable levels.

Mean Volume Diameter

The mean volume diameter of the curable composition was measured using a particle size analyzer (Nanotrac Wave-UT151, manufactured by MicrotracBEL Corp.).

Surface Tension

The surface tension of the curable composition was measured by using AUTOMATIC SUPERFACE TENSION-METER CBVP-Z (manufactured by Kyowa Interface Science Co., LTD.) according to Wilhelmy method. It was measured at 25 degrees C.

Viscosity

Viscosity of the curable compound was measured by a cone plate type rotatory viscometer (VISCOMETER TVE-22L, manufactured by TOKI SANGYO CO., LTD.) using a cone rotor (1°34'×R24) at a rate of rotation at 50 rpm and at 25 degrees C. of hemathermal circulating water.

Evaluation Criteria
S: 10 percent or less
A: Greater than 10 percent to 30 percent
B: Over 30 percent Discharging Stability Using an inkjet discharging head GEN5 (nozzle diameter: 26 μm, manufactured by Ricoh Printing Systems Co., Ltd.), the head was heated to 50 degrees C., decapped, and left for 10 minutes. The discharging stability of the curable composition was evaluated according to the following criteria. A predetermined dummy discharging was conducted before the discharging evaluation.

Evaluation Criteria
A: No missing dots, no bending
B: Partially bends or missing
C: No discharging Hue A solid image was formed by discharging 30 pL per pixel with 300 dpi×300 dpi to form a 5 cm×5 cm solid image. After drying the solid image, the CIE L*a*b color coordinate of the solid image was measured by spectrophotodensitometer (X-Rite 938, manufactured by X-Rite Inc.) to evaluate chromaticity {(color value (b* value)} based on the following evaluation criteria. The rating B and the above are practically usable.

Evaluation Criteria
A: $b^* \leq 1.5$
B: $1.5 < b^* \leq 3.5$
C: $3.5 < b^*$

TABLE 1

| | | HSP value [(J/cm³)⁰·⁵] | Example 1 | 2 | 3 | 4 | 5 |
|---|---|---|---|---|---|---|---|
| Polymerizable compound | a-1 | 24 | 89.7 | | | | |
| | a-2 | 23 | | | 94.6 | | |
| | a-3 | 19 | | 89.6 | | 84.5 | |
| | a-4 | 17 | | | | | 84.6 |
| Polymerization initiator | b-1 | 23 | | 10 | 5 | | 8 |
| | b-2 | 22 | 10 | | | 15 | 7 |
| Fluorescent whitener | c-1 | — | | | | | 0.2 |
| | c-2 | — | | 0.2 | 0.2 | 0.3 | |
| | c-3 | — | 0.1 | | | | |
| | c-4 | — | | | | | |
| Polymerization inhibitor | Methoquinone | — | 0.2 | 0.2 | 0.2 | 0.2 | 0.2 |
| Total (percent by mass) | | | 100 | 100 | 100 | 100 | 100 |
| ΔHSP [(J/cm³)⁰·⁵] | | | 2 | 6 | 0 | 3 | 5.5 |
| Evaluation result | Curability | | A | A | B | A | A |
| | Storage property | | A | A | A | A | A |
| | Discharging stability | | A | B | A | B | B |
| | Hue | | A | A | A | B | B |

TABLE 2

| | | HSP value [(J/cm³)⁰·⁵] | Comparative Example 1 | 2 | 3 | 4 |
|---|---|---|---|---|---|---|
| Polymerizable compound | a-1 | 24 | | | 94.3 | 89.8 |
| | a-2 | 23 | | | | |
| | a-3 | 19 | 89.3 | | | |
| | a-4 | 17 | | 79.6 | | |

TABLE 2-continued

| | | HSP value [(J/cm³)⁰·⁵] | Comparative Example 1 | 2 | 3 | 4 |
|---|---|---|---|---|---|---|
| Polymerization initiator | b-1 | 23 | 10 | 20 | 5 | 10 |
| | b-2 | 22 | | | | |
| Fluorescent whitener | c-1 | — | | 0.5 | | 0.5 |
| | c-2 | — | | | | |
| | c-3 | — | | | 0.2 | |
| | c-4 | — | | | | |
| Polymerization inhibitor | Methoquinone | — | 0.2 | 0.2 | 0.2 | 0.2 |
| Total (percent by mass) | | | 100 | 100 | 100 | 100 |
| ΔHSP [(J/cm³)⁰·⁵] | | | 4 | 6 | 1 | 1 |
| Evaluation result | Curability | | A | A | C | A |
| | Storage property | | C | C | A | A |
| | Discharging stability | | A | C | A | A |
| | Hue | | A | B | A | C |

TABLE 3

| | | HSP value [(J/cm³)⁰·⁵] | Comparative Example 5 | 6 | 7 | 8 |
|---|---|---|---|---|---|---|
| Polymerizable compound | a-1 | 24 | 89.75 | | | 97.6 |
| | a-2 | 23 | | | | |
| | a-3 | 19 | | | | |
| | a-4 | 17 | | 89.6 | 83.6 | |
| Polymerization initiator | b-1 | 23 | 10 | 10 | 16 | 2 |
| | b-2 | 22 | | | | |
| Fluorescent whitener | c-1 | — | 0.05 | | | 0.2 |
| | c-2 | — | | | | |
| | c-3 | — | | | 0.2 | |
| | c-4 | — | | 0.2 | | |
| Polymerization inhibitor | Methoquinone | — | 0.2 | 0.2 | 0.2 | 0.2 |
| Total (percent by mass) | | | 100 | 100 | 100 | 100 |
| ΔHSP [(J/cm³)⁰·⁵] | | | 1 | 6 | 6 | 1 |
| Evaluation result | Curability | | A | A | A | C |
| | Storage property | | A | C | C | A |
| | Discharging stability | | A | C | C | A |
| | Hue | | C | B | B | A |

Details of the materials used in Examples and Comparative Examples in Tables 1 to 3 are as follows.

Polymerizable Compound a-1: Hydroxyethyl acrylate ("HEA", HSP value: 24 [(J/cm³)⁰·⁵], manufactured by Osaka Organic Chemical Industry Ltd.)

a-2: Acryloyl morpholine ("ACMO", HSP value: 23 [(J/cm³)⁰·⁵], manufactured by K J Chemicals Corporation)

a-3: Cyclic trimethylolpropane formal acrylate ("CTFA", HSP value: 19 [(J/cm³)⁰·⁵] manufactured by Osaka Organic Chemical Industry Ltd.)

a-4: Isobornyl acrylate ("IBXA", HSP value: 17 [(J/cm³)⁰·⁵], manufactured by Osaka Organic Chemical Industry Ltd.)

Photo Polymerization Initiator b-1: 2,4,6-trimethylbenzoyl-diphenylphosphine oxide, "IRGACURE TPO", manufactured by BASF Japan Ltd., HSP value: 23 [(J/cm³)⁰·⁵])

b-2: Phenylbis(2,4,6-trimethylbenzoyl)phosphine oxide, "Irgacure 819", HSP value: 22 [(J/cm³)⁰·⁵], manufactured by BASF Japan Ltd.)

Fluorescent Whitener
c-1: "Kayalight OS", benzoxazole derivative, manufactured by Nippon Kayaku Co., Ltd.
c-2: "Hostalux KCB", benzoxazole derivative, manufactured by Clariant AG
c-3: "Tellux KCB", benzoxazole derivative, manufactured by Clariant AG
c-4: "Hostalux KS-N", stilbene bisbenzoxazole derivative, manufactured by Clariant AG
Polymerization Inhibitor
4-methoxyphenol: Methoquinone (manufactured by Seiko Chemical Co., Ltd.)

Aspects of the present disclosure are, for example, as follows.

1. A curable composition includes a polymerizable compound, a polymerization initiator, and a fluorescent whitener containing a benzoxazole derivative, wherein the proportion of the fluorescent whitener is from 5 to 15 percent by mass and the proportion of the polymerization initiator is from 0.10 to 0.3 percent by mass.

2. The curable composition according to 1 mentioned above, wherein the absolute difference between the Hansen solubility parameter (HSP) value of the polymerizable compound and the HSP value of the polymerization initiator is 4 $[(J/cm^3)^{0.5}]$ or less.

3. The curable composition according to 1 or 2 mentioned above, wherein the fluorescent whitener contains 1,4-bis(2-benzoxazolyl)naphthalene.

4. The curable compound according to any one of 1 to 3 mentioned above, wherein the polymerizable compound contains at least one member selected from the group consisting of isobornyl (meth)acrylate, (meth)acryloylmorpholine, cyclic trimethylolpropane formal (meth)acrylate, and hydroxyethyl (meth)acrylate.

5. The curable composition according to any one of 1 to 4 mentioned above wherein the polymerizable compound contains a monofunctional monomer and the proportion of the monofunctional monomer is from 50 to 90 percent by mass to the total content of the curable composition.

6. The curable composition according to any one of 1 to 5 mentioned above, further contains a coloring material.

7. The curable composition according to any one of 1 to 6 mentioned above is a curable clear ink composition containing substantially no coloring material.

8. The curable composition according to any one of 1 to 7 mentioned above, wherein the curable composition is an active energy ray curable composition.

9. The curable composition according to any one of 1 to 8 mentioned above is for use in inkjet method.

10. An accommodating unit includes a container containing the curable composition of any one of 1 to 9 mentioned above.

11. A device for forming a two or three dimensional image includes
an accommodating unit configured accommodating the curable composition of any one of 1 to 9 mentioned above,
an application device configured to apply the curable composition, and a curing device configured to cure the curable composition.

12. The device according to 11 mentioned above, wherein the curing device includes a light-emitting diode configured to emit light having a wavelength of from 350 to 450 nm.

13. A method of forming a two or three dimensional image includes applying the curable composition of any one of 1 to 9 mentioned above and curing the curable composition.

14. The method according to 13 mentioned above, wherein the curing includes emitting light having a wavelength of from 350 to 450 nm by a light-emitting diode light source.

15. Cured matter formed by using the curable composition of any one of 1 to 9 mentioned above.

16. A processed product manufactured by processing the cured matter of 15 mentioned above.

17. A decorated object having a substrate having a surface decorated with the processed product of 16 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A curable composition comprising:
a polymerizable compound comprising at least one monofunctional monomer selected from the group consisting of isobornyl (meth)acrylate, (meth)acryloyl morpholine, cyclic trimethylolpropane formal (meth)acrylate, and hydroxyethyl (meth)acrylate;
a polymerization initiator comprising an acylphosphineoxide compound; and
a fluorescent whitener comprising a benzoxazole derivative,
wherein a proportion of the fluorescent whitener is from 0.10 to 0.3 percent by mass, wherein a proportion of the polymerization initiator is from 5 to 15 percent by mass,
wherein a proportion of the monofunctional monomer is from 84.5 to 94.6 percent by mass,
and
wherein an absolute difference between the Hansen solubility parameter (HSP) value of the polymerizable compound and the HSP value of the polymerization initiator is 4 $[(J/cm^3)^{0.5}]$ or less.

2. The curable composition according to claim 1, wherein the fluorescent whitener comprises 1,4-bis(2-benzoxazolyl) naphthalene.

3. The curable composition according to claim 1, being a curable clear ink composition containing substantially no coloring material.

4. The curable composition according to claim 1, being an active energy ray curable composition.

5. The curable composition according to claim 1 for inkjet.

6. An accommodating unit comprising:
a container containing the curable composition of claim 1.

7. A device for forming a two or three dimensional image comprising:
an accommodating unit accommodating the curable composition of claim 1;
an application device configured to apply the curable composition; and
a curing device configured to cure the curable composition.

8. The device according to claim 7, wherein the curing device includes a light-emitting diode configured to emit light having a wavelength of from 350 to 450 nm.

9. A method of forming a two or three dimensional image, comprising:
applying the curable composition of claim 1; and
curing the curable composition.

10. The method according to claim 9, wherein the curing includes emitting light having a wavelength of from 350 to 450 nm by a light-emitting diode.

11. Cured matter formed by using the curable composition of claim 1.

12. The curable composition according to claim 1, which is free of an organic solvent.

13. A method of forming a three dimensional image, comprising:
applying the curable composition of claim 1 onto a stage;
curing the curable composition to form a cured layer on the stage; and
applying the curable composition onto the cured layer.

14. The curable composition according to claim 1, consisting essentially of:
the polymerizable compound;
the polymerization initiator;
the fluorescent whitener; and
optionally a polymerization inhibitor.

15. The curable composition according to claim 1, further comprising:
at least one component selected from the group consisting of a coloring material, a surfactant, a polymerization inhibitor, a leveling agent, a defoaming agent, a penetration-enhancing agent, a wetting agent (humectant), a fixing agent, a viscosity stabilizer, a fungicide, a preservative, an antioxidant, an ultraviolet absorbent, a chelate agent, a pH regulator, and a thickener.

16. The curable composition according to claim 15, wherein the fluorescent whitener is 1,4-bis(2-benzoxazolyl)naphthalene.

17. A method of forming a three dimensional image, comprising:
applying the curable composition of claim 15 onto a stage;
curing the curable composition to form a cured layer on the stage; and
applying the curable composition onto the cured layer.

18. The curable composition according to claim 1, wherein the polymerization initiator comprises at least one selected from the group consisting of 2,4,6-trimethylbenzoyl-diphenylphosphine oxide or phenylbis(2,4,6-trimethylbenzoyl)phosphine oxide.

19. The curable composition according to claim 2, wherein the polymerization initiator comprises at least one selected from the group consisting of 2,4,6-trimethylbenzoyl-diphenylphosphine oxide and phenylbis(2,4,6-trimethylbenzoyl)phosphine oxide.

* * * * *